April 24, 1956     C. G. STONE     2,742,694
MECHANICAL SHAVER
Filed Aug. 2, 1950
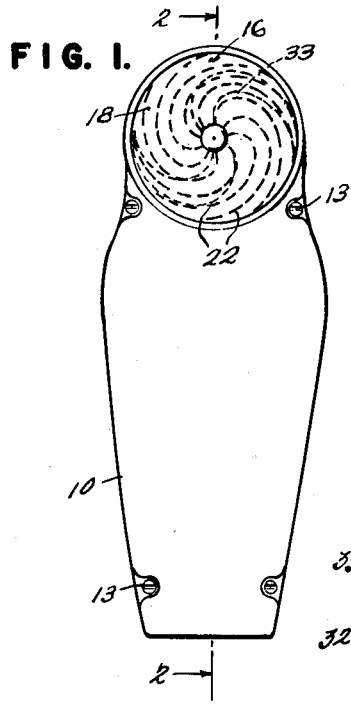
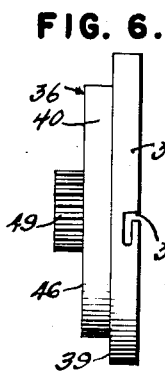
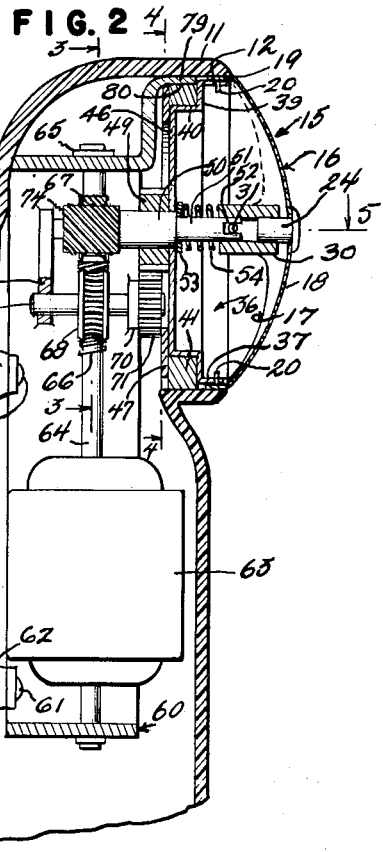
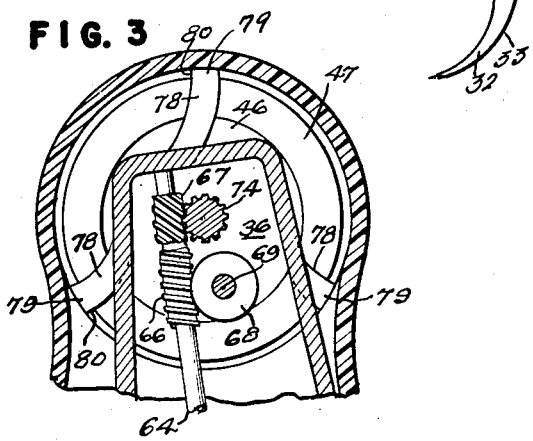
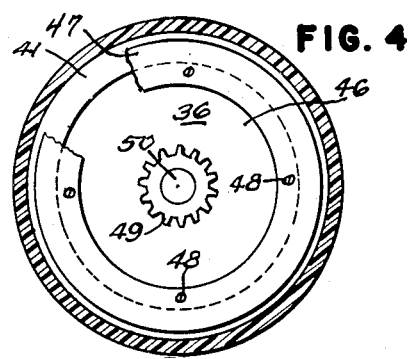
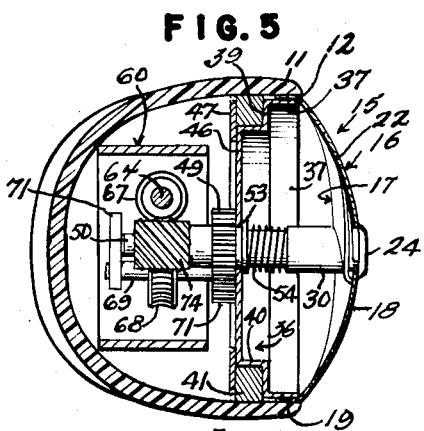
INVENTOR
CHARLES G. STONE
BY
Parker and Walsh
ATTORNEYS

United States Patent Office 2,742,694
Patented Apr. 24, 1956

2,742,694

MECHANICAL SHAVER

Charles G. Stone, Greenville, Pa.

Application August 2, 1950, Serial No. 177,292

13 Claims. (Cl. 30—43)

This invention relates to a mechanical shaver.

An important object of the present invention is to provide a novel mechanical shaver wherein a highly efficient shaving action is provided through the cooperative relation of the elements of the shearing head through which a direct shearing action is provided in the cutting of the hairs of the beard.

A further object is to provide a novel plate and associated elements wherein the blade has edge portions moving in the greatest possible number of directions at the same time, without manual effort on the part of the operator, thus increasing the efficiency of the shaving action.

A further object is to provide a mechanical shaver the blade of which can be operated at a higher rate of speed in contact with the comb element, without the usual vibration caused by oscillating or reciprocating blades.

A further object is to provide such a device wherein the cutting unit is rotary to eliminate vibration, and wherein the blade edges cooperate with openings in the comb to provide a highly efficient shearing operation through the slight relative angle between each opening and the portion of a cutting edge passing therebeneath.

A further object is to provide a blade and associated comb the contacting surfaces of which define sections of a sphere, thus permitting easy grinding to exact specifications and wherein the rotary action of the blade makes it self-sharpening.

A further object is to provide a novel type of comb which, because of its shape, may be made extremely thin while resisting distortion under reasonable pressure, thus permitting the blade to operate very close to the skin.

A further object is to provide a relatively rotatable comb and blade, with the comb rotating comparatively slowly in a direction opposite to the direction of rotation of the blade, whereby the comb gently massages the skin and tends to hold it smooth while gently pulling it in exact opposition to the movement of the edge of the blade at any point adjacent the surface of the comb, thus increasing the efficiency of the shaving operation.

Other objects and advantages of the invention will become apparent during the course of the following description.

In the drawing, I have shown one embodiment of the invention. In this showing,

Figure 1 is a face view of the completed shaver,

Figure 2 is an enlarged fragmentary sectional view on line 2—2 of Figure 1,

Figure 3 is a similar view on line 3—3 of Figure 2,

Figure 4 is a similar view on line 4—4 of Figure 2, parts being broken away,

Figure 5 is an enlarged sectional view on line 5—5 of Figure 2,

Figure 6 is an edge elevation of a cup structure employed in the shearing head, and Figure 7 is a face view of the blade unit.

Referring to Figures 1 and 2, the numeral 10 designates the body of the device in the form of a hollow vertically elongated casing extending transversely as at 11 and open as at 12 to receive the shearing head to be referred to later. The casing 10 is preferably formed of complementary plastic sections secured together as at 13. The specific material and type of casing form no part per se of the present invention and need not be described in detail.

The shearing head is indicated as a whole by the numeral 15 and primarily comprises two elements, namely, a comb 16 and blade unit 17. The comb 16 comprises a body 18 formed as a section of a sphere, and because of such shape, the body 18 may be made of relatively thin material and still resist distortion. The comb 16 is provided with a peripheral annular flange 19 provided at diametrically opposite points with radially inwardly extending relatively short pins 20 for a purpose to be described. The spherical portion or body 18 of the comb is provided with lines of narrow openings 22 through which the hairs of the beard project to be cut in the manner to be described. Each line of openings 22 is positioned along a spiral curve as shown in Figure 1, and in one embodiment of the invention, as illustrated, each line of openings spirals from its inner limit to its outer limit around substantially two hundred and seventy degrees with respect to the opening 12. The comb is provided with an inwardly extending axial stud 24 for a purpose to be described.

The blade unit 17 comprises a hub 30 of an internal diameter corresponding to the diameter of the stud 24 to receive the latter to be rotatably supported thereby. The stud 24 extends into one end of the hub 30, as shown in Figure 2, and adjacent its other end, the hub is provided with a diametrical driving pin 31 utilized in the manner to be described. In the present instance, the unit 17 is shown as being provided with two blades 32 generally spirally formed. Each blade 32 is provided with a leading cutting edge 33 which is spiralled to extend through a different part of a circle than the spiral of each line of openings 22. In the present instance, each leading edge 33 spirals through approximately one hundred and eighty degrees. Wherever any portion of either edge 33 crosses one of the openings 22, therefore, the blade will be slightly angled relative to such opening. This provides a shearing cutting operation which will become more apparent below. Attention is invited to the fact, however, that the specific degrees of spiralling of the cutting edges 33 and openings 22 are not limited, in any way, so long as each cutting edge passes across each opening 22 at an angle thereto.

The comb 16 is carried by an annular cup indicated as a whole by the numeral 36. This cup comprises a cylindrical flange 37 provided at diametrically opposite points with bayonet slots 38 to receive the pins 20 to fix the comb 16 to the cup 36. Adjacent the flange 37, the cup is provided with an inwardly extending wall portion 39, perpendicular to the axis of the blade, and at the inner extremity of the wall 39, the cup is provided with a second cylindrical portion 40 cooperating with the flange 39 to form a pocket to receive a bearing ring 41 to be further referred to in detail below. It will become apparent that this ring is stationary and rotatably supports the cup 36 for relatively slow rotation as a unit with the comb 16. The bayonet slot 38 is so formed that rotation imparted to the cup 36 in a manner to be described maintains the pins 20 in the inner ends of the bayonet slots.

The cup 36 further comprises a wall or disc portion 46 flush with the ring 41 and arranged perpendicular to the rotational axis of the blade. A retaining ring 47 is secured to the disc 46 by screws 48 (Figure 4) and serves to hold the cup in its position on the stationary bearing ring 41 while allowing a free rotary movement of the cup. A spur gear 49 is fixed to the disc 46 and is apertured axially to act as a bearing to rotatably support a shaft 50.

As shown in Figure 2, the shaft 50 is provided with a reduced end 51 projecting into the hub 30 of the blade unit and slotted as at 52 to receive the pin 31 to provide a driving connection between the shaft 50 and the blade unit. A washer 53 seats against the shoulder at the inner end of the shaft portion 51 and against the disc 46 and a light compression spring 54 is arranged between the washer 53 and the hub 30 to gently urge the latter toward the comb 16. The contacting faces of the comb 16 and blades 32 are formed as sections of the same sphere, and the spring 54 accordingly lightly maintains the cutting blades in engagement with the inner face of the comb 16. The blade is rotated in one direction through means described below, by driving the shaft 51 while the comb 16 is relatively slowly rotated in the opposite direction through the medium of the gear 49.

Within the housing 10 is arranged a supporting frame indicated as a whole by the numeral 60. This frame forms no part of the present invention and need not be particularly described in detail. The frame is fixed in the casing 10 in any suitable manner, for example by screws 61 extending through suitable bosses 62 preferably formed integral with one section of the casing 10. The frame supports an electric motor 63, the shaft 64 of which extends upwardly as shown in Figure 2 and preferably has its upper end journaled in a bearing 65 formed integral with the frame 60. The shaft 64, as more clearly shown in Figure 3, carries a pair of worm gears 66 and 67 which are respectively relatively low and high pitched. The worm 66 meshes with a worm wheel 68 (Figures 2 and 3) mounted on a shaft 69 journaled in bearings 70 forming a part of the frame 60. The shaft 69 carries a gear 71 meshing with the gear 49.

The shaft 50 has formed thereon a spiral gear 74 meshing with the worm 67. Obviously, the shaft 50 is fixed against movement toward the right as viewed in Figure 2 by its shouldered construction, while the left hand end of the shaft 50 seats against an extension of the bearing 70 to prevent movement in the opposite direction. The only bearings for supporting the shaft 50, therefore, are formed by the gear 49 and by the stud 24 which rotatably supports the blade hub 30. This provides a highly simplified advantageous arrangement wherein all of the operating rotary parts are efficiently rotatably supported relative to each other with no chance for a misalignment of bearings and permitting the complete removal of the shearing head 15, cup 36 and shaft 50 as a unit.

The supporting frame 60, at the top thereof, carries a plurality of preferably integral arms 78 having their ends 79 circumferentially spaced and projecting longitudinally of the shaft 50 in the opening 12. The arm ends 79 have a slight spring tension and may be arranged about one hundred and twenty degrees apart, as shown in Figure 3, and each is received in a recess 80 formed in the periphery of the bearing ring 41. The securing ring 47 terminates radially inwardly of the outer surface of the ring 41 to provide space for the arm ends 79, which arm ends are snugly fitted between the ring 41 and the transverse portion 11 of the body 10, as shown in Fig. 2, and by virtue of this and the slight spring tension serve to anchor the bearing ring 41 in position and against rotation.

*Operation*

The motor 63 drives the shaft 64 to rotate the worms 66 and 67. The low pitched worm 66 relatively slowly drives the worm wheel 68 to rotate the gear 71. This gear, meshing with the gear 49, slowly rotates the cup 36, and through it, the comb 16.

The worm 67, which is relatively high pitched, meshes with the spiral gear 74, smaller in diameter than the worm wheel 68, to rotate the shaft 50 at a relatively high speed. The pin 31 and slot 52 form a driving connection between the shaft 50 and hub 30, and accordingly the blades 32 will be driven at high speed. The worms 66 and 67 rotate in the same direction, being carried by the shaft 64. The shaft 50, directly rotatably connected to the blade unit 17, is rotated in one direction, namely a counter-clockwise direction as viewed in Figure 7, while the comb 16 is driven in the opposite direction since the intermediate gear 71 reverses the direction of rotation of the comb.

Accordingly, it will be apparent that the comb is rotated relatively slowly in one direction, while the blade unit is rotated at high speed in the opposite direction. Such slow rotation of the comb gently massages the skin and tends to pull it gently and hold it smooth while the blade is shaving across the inner face of the comb 16. The gentle pull exerted against the skin obviously is in a direction opposite to movement of the blades at every point throughout the surface of the comb. The holding of the skin opposite to the direction of shaving increases the efficiency of the shaving action.

The spherical shape of the comb 16 renders this element relatively rigid for a given thickness of the material of the comb, and accordingly the comb may be made extremely thin without any tendency for the comb to be distorted from its normal shape under reasonable pressure. This permits a closer shave than customarily is possible with mechanical shaving devices.

As previously stated, wherever a portion of either cutting edge 33 crosses an opening of any line 22, such opening and the adjacent portion of the blade edge will be at an angle to each other, preferably a slight angle, and this provides an efficient shearing action for efficient shaving. Moreover, there are at all times portions of the cutting edges traveling in all different rotational directions, and any individual hairs of the beard, as the device is moved even a relatively short distance over the skin, will be subjected to highly varying shearing actions from many different directions so that if a given hair is not cut in one opening 22, it will almost certainly be cut in another opening. The shaving head is easily moved manually over all parts of the face and neck to contact the skin with fairly even pressure throughout most of its surface and will pick up every hair and hold it taut while the blade cuts the hair with a slicing or shearing action rather than a chopping motion. In this connection, it will be noted that no portion of the cutting edge of either blade is ever parallel to any opening or slot 22 and they never cross each other perpendicularly. Accordingly, a smooth shearing action is assured at all times.

A number of the elements of the device forming and associated with the shearing head is assembled as an efficient unit. The cup 36 and comb 16 are connected together, and the cup carries the shaft 50, the gear 49 serving as a bearing for such shaft. The blade unit is carried by the shaft 50, and all of these units can be assembled outside the machine and inserted as a unit by simply pressing the bearing ring 41 into its position within the arm ends 79 of the frame 60 where it is held stationary. All rotational parts associated with the shearing head are efficiently rotatably supported accurately with respect to the axis of the shaft 50, there being no bearing supports for any of the elements referred to except those forming a part of the head unit referred to. Accordingly, there is no chance for misalignment of the parts with subsequent vibration, chattering and undue wear.

The exact spherical shape of the engaging surfaces of the comb and blade unit permit accurate grinding, and the rotation of the blade against the comb, in uniform contact therewith, makes the cutting edges self-sharpening. The rotational cutting feature as distinguished from oscillating and reciprocating blades eliminates vibrating forces which are annoying in the use of conventional shaving devices, and the arrangement of parts renders the device highly efficient in use.

I claim:

1. In a mechanical shaver, a rotatable comb element formed of relatively thin material provided with slots therethrough positioned along lines of spiral curves, and a blade unit rotatable in contact with one face of said comb element, the contacting faces of said comb element and said blade unit being formed as sections of a sphere with the center of which the axis of rotation of said blade unit is coincident, said blade unit comprising a blade having a spirally shaped cutting edge each portion of which passes over one of said slots at a slight angle thereto.

2. In a mechanical shaver, a comb element formed as a section of a sphere and provided with convex and concave faces and having lines of slots formed therethrough and positioned along spiral curves, and a blade unit having one side thereof corresponding in curvature to and operable in contact with the concave face of said comb element, said blade unit comprising a blade element having a cutting edge shaped in the form of a spiral curve, the lines of slots in said comb element each being spiraled differently from the spiral of said cutting edge whereby each portion of the latter as it passes over each one of said slots will form a relatively angled intersection with respect thereto which will move constantly in both a radial and circular direction with respect to the axis of rotation of the blade unit throughout the entire length of each of the spiral curves, thereby providing a constant V-shaped opening between the cutting edges of the comb slots and the blade, the open end of said V-shaped opening being disposed toward the hairs to be cut whereby they will be guided thereinto for cutting.

3. In a mechanical shaver, a comb element formed of relatively thin material provided with a plurality of lines of apertures therein, and a blade unit rotatable in contact with one face of said comb element, said lines of apertures being disposed along spiral curves having their inner ends positioned adjacent the axis of rotation of said blade unit and extending outwardly therefrom in one circumferential direction, said blade unit having a cutting edge positioned along a spiral curve extending outwardly from adjacent the axis of rotation thereof in the same circumferential direction as said lines of apertures, the lines of apertures in said comb element each being spiraled differently from the spiral of said cutting edge.

4. A mechanical shaver comprising a body having a circular opening, a cut rotatably mounted in said opening, an apertured comb element carried by said cup for rotation therewith, a blade unit operable over and in contact with the inner face of said comb element, a shaft rotatably supporting said blade unit, bearing means for said shaft supported by said cup, and means for rotating said cup and comb element and said shaft and blade unit in opposite directions.

5. A mechnical shaver comprising a body having a circular opening, a cup rotatably mounted in said opening, an apertured comb element carried by said cup for rotation therewith, a blade unit operable over and in contact with the inner face of said comb element, a shaft rotatably supporting said blade unit, bearing means for said shaft supported by said comb and cup, the inner face of said comb element being concave and formed as a section of a sphere and said blade unit corresponding in curvature thereto, and means for rotating said shaft at a relatively high speed in one direction and said cup and comb element at a slower speed in the opposite direction.

6. A mechanical shaver comprising a body having a circular opening, a shearing head arranged in said opening, said shearing head comprising an apertured comb element and a blade unit operable over and in contact with the inner face of said comb element, a shaft rotatably supporting said blade unit, bearing means for said shaft supported solely by said shearing head, the inner face of said comb element being concave and formed as a section of a sphere and said blade unit corresponding in curvature thereto, said blade unit comprising a blade having a spiraled cutting edge and the apertures in said comb element being in the form of slots slightly angled relative to the portion of the cutting edge passing thereover to provide a constant opening between the blade and comb cutting edges immediately preceding their intersection; the said cutting edges forming a V with the open end approaching the hairs to be cut, to facilitate projection of the hairs between the edges for cutting at the intersection, and means for rotating said shaft at a relatively high speed.

7. A mechanical shaver comprising a body having a circular opening, a shearing head arranged in said opening, said shearing head comprising an apertured comb element and a blade unit operable over and in contact with the inner face of said comb element, a shaft rotatably supporting said blade unit, bearing means for said shaft supported solely by said shearing head, the inner face of said comb element being concave and formed as a section of the sphere and said blade unit corresponding in curvature thereto, means for rotating said shaft at a relatively high speed in one direction, and means for rotating said comb element at a relatively low speed in the opposite direction.

8. A mechanical shaver comprising a body having a circular opening, a shearing head arranged in said opening, said shearing head comprising an apertured comb element and a blade unit operable over and in contact with the inner face of said comb element, a shaft rotatably supporting said blade unit, bearing means for said shaft supported solely by said shearing head, the inner face of said comb element being concave and formed as a section of the sphere and said blade unit corresponding in curvature thereto, said blade unit comprising a blade having a spiraled cutting edge and the apertures in said comb element being in the form of slots slightly angled relative to the portion of the cutting edge passing thereover to provide a shearing action, means for rotating said shaft at a relatively high speed in one direction, and means for rotating said comb element at a relatively low speed in the opposite direction.

9. A mechanical shaver comprising a body having a circular opening, a shearing head comprising a comb element, and a rotatable cup arranged in said opening and having an annular flange to which said comb element is connected, said comb element being formed of relatively thin material and being apertured, a blade unit within said shearing head operable over the inner face of said comb element, a shaft connected to said blade unit, and bearing means supported by said comb element and said cup wholly independently of said body for supporting said shaft for rotation, and means for simultaneously rotating said shaft in one direction and said cup and comb element in the opposite direction.

10. A mechanical shaver comprising a body having a circular opening, a shearing head comprising a comb element, and a cup arranged in said opening and having an annular flange to which said comb element is connected, said comb element being formed of relatively thin material and being apertured, a blade unit within said shearing head operable over the inner face of said comb element, a shaft connected to said blade unit, bearing means supported by said comb element and said cup wholly independently of said body for supporting said shaft for rotation, means for rotating said shaft at a relatively high speed in one direction, and means for rotating said cup and said comb element at a relatively low speed in the opposite direction.

11. A mechanical shaver comprising a body having a circular opening, a shearing head comprising a comb element, and a cup arranged in said opening and having an annular flange to which said comb element is connected, said comb element being formed of relatively thin material and being apertured, a blade unit within said shearing head operable over the inner face of said comb element, a shaft connected to said blade unit, bearing means supported by said comb element and said cup wholly independently of said body for supporting said shaft for rotation, a bearing ring surrounding a portion of said cup to support it for rotation on a common axis with said shaft, means for rotating said shaft at a relatively high speed in one direction, and means for rotating said cup and said comb at a relatively low speed in the opposite direction.

12. A mechanical shaver comprising a body having a circular opening, a shearing head comprising a comb element, and a cup arranged in said opening and having an annular flange to which said comb element is connected, said comb element being formed of relatively thin material and being apertured, a blade unit within said shearing head operable over the inner face of said comb element, a shaft connected to said blade unit, a gear fixed to said cup and provided with a bearing opening rotatably supporting said shaft, bearing means carried by said comb element for supporting said shaft for rotation and spaced from said gear, a stationary bearing ring surrounding a portion of said cup coaxial with said shaft for supporting said cup and said comb for rotation, means for driving said shaft at a relatively high speed in one direction, and drive means engaging said gear to drive said cup and said comb at a relatively low speed in the opposite direction.

13. A mechanical shaver comprising a body having a circular opening, a shearing head comprising a comb element and a cup arranged in said opening and having an annular flange to which said comb element is connected, said comb element being formed of relatively thin material and being apertured, a blade unit within said shearing head operable over the inner face of said comb element, a shaft connected to said blade unit, a gear fixed to said cup and provided with a bearing opening rotatably supporting said shaft, said blade unit having a hub slidably receiving the adjacent end of said shaft and fixed against rotation relative thereto, a pin carried by said comb element and engaging in said hub to rotatably support said blade unit and the adjacent end of said shaft, spring means between said gear and said hub to maintain said blade unit in operative contact with said comb element, a stationary bearing ring surrounding a portion of said cup coaxial with said shaft for supporting said cup and said comb element for rotation, means for driving said shaft at a relatively high speed in one direction, and driving means engaging said gear to drive said cup and said comb element at a relatively low speed in the opposite direction.

References Cited in the file of this patent

UNITED STATES PATENTS

| | | |
|---|---|---|
| 2,119,021 | Maskovics et al. | May 31, 1938 |
| 2,166,035 | Aronson | July 11, 1939 |
| 2,167,833 | Gold | Aug. 1, 1939 |
| 2,212,624 | Testi | Aug. 27, 1940 |
| 2,242,752 | Meyer | May 20, 1941 |
| 2,283,834 | Von Dam et al. | May 19, 1942 |
| 2,500,378 | Quackenbush et al. | Mar. 14, 1950 |